United States Patent
Russell et al.

(10) Patent No.: US 7,035,387 B2
(45) Date of Patent: Apr. 25, 2006

(54) METHODS AND SYSTEMS FOR DETECTING AND MITIGATING INTRUSION EVENTS IN A COMMUNICATIONS NETWORK

(75) Inventors: Travis Earl Russell, Clayton, NC (US); Peter Joseph Marsico, Chapel Hill, NC (US)

(73) Assignee: Tekelec, Calabasas, CA (US)

( * ) Notice: Subject to any disclaimer, the term of this patent is extended or adjusted under 35 U.S.C. 154(b) by 231 days.

(21) Appl. No.: 10/786,713

(22) Filed: Feb. 24, 2004

(65) Prior Publication Data

US 2005/0185777 A1    Aug. 25, 2005

(51) Int. Cl.
 H04M 15/00    (2006.01)
 H04M 17/00    (2006.01)
 H04M 3/00    (2006.01)

(52) U.S. Cl. ............. 379/114.14; 379/127.02; 379/145; 379/112.06; 379/189

(58) Field of Classification Search ........... 379/112.01, 379/112.06, 114.01, 114.03, 114.14, 114.28, 379/121.04, 121.06, 126, 127.01, 127.02, 379/133, 137, 145, 188, 189, 194, 200, 241, 379/249; 455/410
See application file for complete search history.

(56) References Cited

U.S. PATENT DOCUMENTS

| | | | | |
|---|---|---|---|---|
| 5,495,521 | A * | 2/1996 | Rangachar | 379/145 |
| 5,627,886 | A * | 5/1997 | Bowman | 379/111 |
| 5,706,338 | A * | 1/1998 | Relyea et al. | 379/189 |
| 5,757,895 | A * | 5/1998 | Aridas et al. | 379/136 |
| 5,802,145 | A * | 9/1998 | Farris et al. | 379/32.03 |
| 5,946,379 | A * | 8/1999 | Bhusri | 379/115.01 |
| 6,393,113 | B1 * | 5/2002 | Karras | 379/133 |
| 6,760,421 | B1 * | 7/2004 | Heilmann et al. | 379/189 |

* cited by examiner

Primary Examiner—Quoc Tran
(74) Attorney, Agent, or Firm—Jenkins, Wilson & Taylor, P.A.

(57) ABSTRACT

Methods and systems for detecting intrusion events, such as war dialing events are disclosed. According to one method, signaling messages associated with calls being made or attempted in a telecommunications network are analyzed. Based on the signaling messages, it is determined whether a war dialing event has occurred or is in progress. In response to determining that a war dialing event has occurred or is in progress, a war dialing event mitigating action is performed.

46 Claims, 9 Drawing Sheets

METHODS AND SYSTEMS FOR DETECTING AND MITIGATING INTRUSION EVENTS IN A COMMUNICATIONS NETWORK

TECHNICAL FIELD

The present invention relates to detecting and mitigating intrusion events in a communications network. More particularly, the present invention relates to methods and systems for detecting and mitigating war dialing intrusion events in a telecommunications network.

BACKGROUND ART

Telecommunications service providers and their customers are constantly facing attacks on their network infrastructures. Attackers, referred to as hackers and phreakers, routinely use software applications and modems to war dial within a service provider's network. War dialing refers to the process of dialing multiple directory numbers with the purpose of locating a modem or voice mail port for later attack. Once a modem or voice mail port has been found, attackers document and store the number for later attacks.

FIG. 1 illustrates an exemplary signaling system 7 (SS7) signaling network 100, which is used to facilitate the setup and tear down of calls between a war dialing calling party 102 and called parties 104, 106, and 108. In this example, calling party 102 is served by an originating end office 110, which is connected via one or more signaling links to STP 112. STP 112 is in turn connected to STP 114 via one or more signaling links. STP 114 is connected to terminating end office 116 via one or more signaling links. In this example of war dialing, calling party 102 first dials the directory number of called party 104 at 3:31:30 pm. Originating end office 110 facilitates the setup of a call between the calling and called parties by generating a transmitting an ISDN user part (ISUP) initial address message (IAM). The IAM message is transmitted to STP 112 and routed to STP 114 and terminating end office 116. A voice trunk is established between the originating and terminating end offices, thereby creating a voice path between the war dialing calling party and the first called party 104.

In this example, called party 104 is a data modem associated with a computer, and, as such, calling party 102 will detect the characteristic tonal response of the answering modem and may subsequently record this finding, along with the directory number of called party 104 for later exploitation. The amount of time required for calling party 102 to make such a determination is typically very short (e.g., less than one minute). Once calling party 102 has completed an initial assessment of the first called party 104, calling party 102 terminates the call. When calling party 102 goes on-hook, originating end office 110 generates an ISUP release (REL) message, which is transmitted to terminating end office 116 in a manner similar to that described previously with respect to the IAM message. Once war dialing calling party 102 terminates the first call by going on-hook, war dialing calling party 102 dials the directory number associated with called party 106 at 3:32:00 pm. A similar signaling process is repeated for this call and any calls that the war dialer may attempt. As described above, once the initial survey of called parties has been completed, the war dialer may target selected called parties for further study or exploitation. As such, some or possibly all of the originally called parties may be later called by the war dialer, where the war dialer may use the same or a different line to make the second round of calls.

Voice mail ports are highly susceptible to unauthorized access by attackers looking for ways to place long distance calls without being detected via traditional call trap and trace monitoring systems. These ports may, for example, be used by groups that wish to establish untraceable communications within a country or between different countries. The voice mail port can be traced using call tracing techniques, but identifying the number of the party who has hijacked the voice mail port will not show up in a call trace. Call traces only identify calling and called parties (the voice mail port and the party called from the voice mail port) point-to-point.

Modems can also be used to gain unauthorized access to computer systems. For example, once a war dialer locates a modem, the war dialer may be able to gain unrestricted access to a computer system. Even if the computer system is password protected, the war dialer can try different passwords until access is gained.

If telecommunications service providers had a tool or utility that could monitor and detect war dialing events, they would be better equipped to identify potential threats in real time or near real time and protect their customer bases from potential attacks. Consequently, there exists a long felt need for a methods and systems for identifying and mitigating war dialing events in a communications network.

DISCLOSURE OF THE INVENTION

According to one aspect, the present invention includes a war dialing event (WDE) detection and mitigation system that analyzes call signaling messages in a telecommunications network to identify war dialing events. Once a WDE is detected, various mitigating actions may be performed. These mitigating actions include generating a WDE alarm or notification message and blocking calls from the offending war dialer.

A WDE detection and mitigation system may monitor signaling links or signaling link sets using signaling link probes. The WDE detection and mitigation system may monitor signaling message traffic on one or more signaling links and generate a call detail record (CDR) for each observed call. Alternatively, a WDE detection and mitigation system may receive a CDR feed from an external CDR generating platform located in a communications network.

CDRs may be used by WDE analysis and screening functions associated with the WDE detection and mitigation system to detect a WDE. A WDE may be indicated by the placement of multiple, short duration calls in rapid succession from a calling party to a first group of called parties. Confirmation of the WDE may be obtained by observing a second event, in which a second group of called parties that include at least some called parties in the first group of called parties are contacted by the same or another calling party.

In yet another implementation, a WDE detection and mitigation system of the present invention may be integrated within a signaling network element, such as an STP, an SS7-Internet protocol signaling gateway (SG), a session initiation protocol (SIP) proxy server, a media gateway controller (MGC), an end office, or a tandem office. In the case of an STP-based WDE detection system, ISUP messages received at the STP may be copied, stored, and analyzed to detect a WDE. CDRs may be generated at the STP or provided to the STP-based WDE detection system from an external CDR generation system and subsequently used to detect and mitigate a WDE.

Accordingly, it is an object of the present invention to provide methods and systems for detecting and mitigating war dialing events in a communications network.

It is another object of the invention to provide methods and systems for detecting and mitigating war dialing events using a network routing element.

Some of the objects of the invention having been stated hereinabove, other objects will be evident as the description proceeds, when taken in connection with the accompanying drawings as best described hereinbelow.

BRIEF DESCRIPTION OF THE DRAWINGS

Preferred embodiments of the invention will now be described with reference to the accompanying drawings of which.

DETAILED DESCRIPTION OF THE INVENTION

According to one embodiment, the present invention includes a war-dialing event detection and mitigation system that operates as a stand-alone entity in a communications network environment. In an alternate embodiment, a WDE detection and mitigation system may be integrated within an communications network element, such as an STP, an SS7-IP gateway, a SIP proxy server, a media gateway controller (MGC), a tandem office, or an end office. Detecting and mitigating war dialing at any suitable platform for performing a telephony signaling and/or switching function in addition to WDE detection and mitigation is intended to be within the scope of the invention.

The stand-alone and integrated WDE detection and mitigation systems are described and illustrated herein as collections of functions, modules or processors. It is understood that these functions, modules, or processes may be implemented in software residing in memory and executed by one or more general-purpose microprocessors. Alternatively, the functions, modules, or processes described herein may be implemented in hardware, such as application-specific integrated circuits (ASICs) or in firmware, such as programmable logic devices. Any combination of hardware, software, and firmware for providing WDE detection and mitigation functionality as described herein is intended to be within the scope of the invention.

Exemplary WDE Detection System

Figure 2:
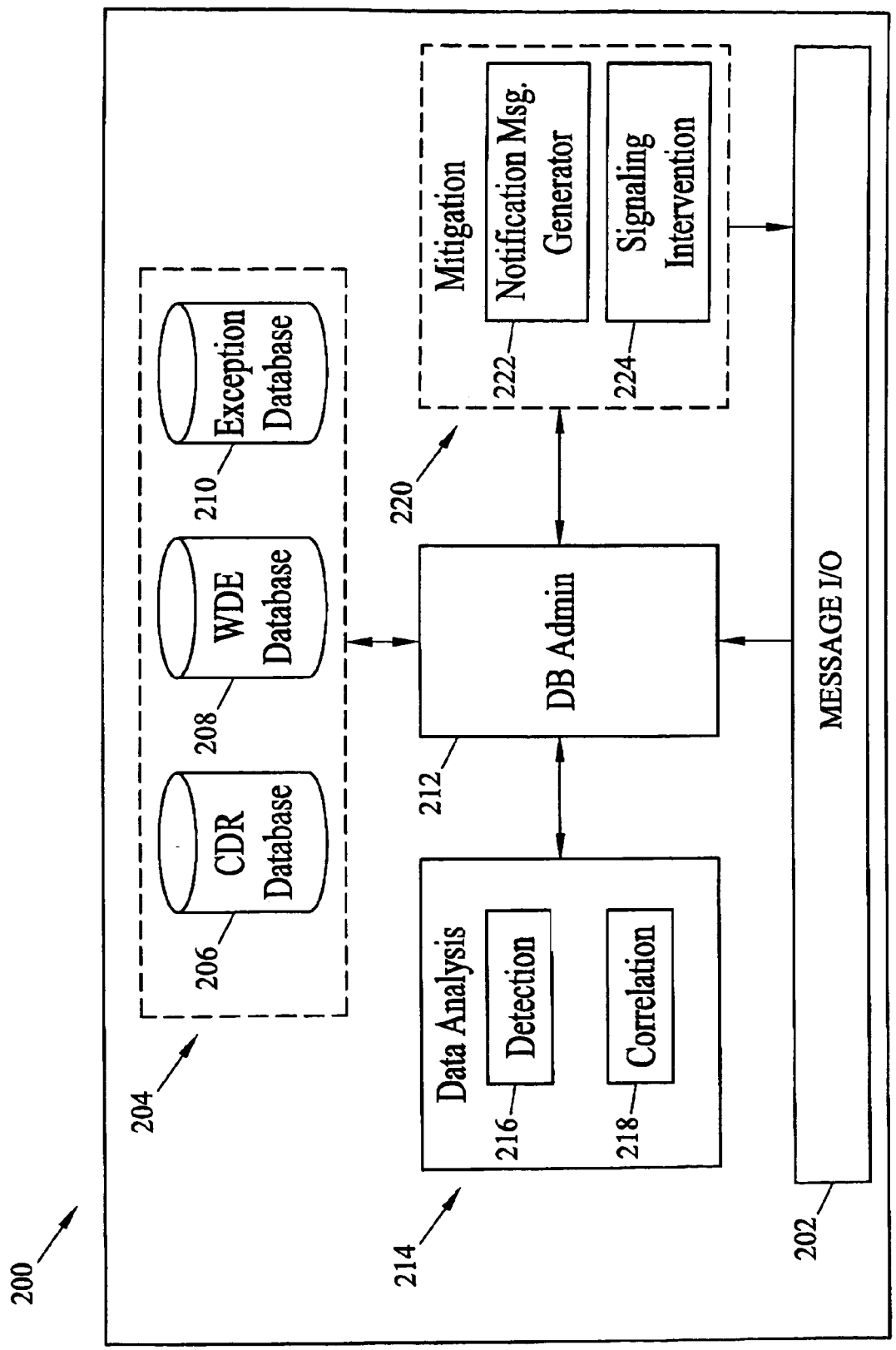
FIG. 2 is a block diagram of an exemplary internal architecture for a stand-alone WDE detection and mitigation system according to an embodiment of the present invention.

FIG. 2 is a block diagram illustrating a WDE detection and mitigation system 200 according to an embodiment of the present invention. In FIG. 2, system 200 includes a message input/output function 202 that receives call signaling messages. System 200 also includes data storage 204. In the illustrated example, data storage 204 includes a call detail record (CDR) database 206, a war dialing event database 208, and an exceptions database 210. CDR database 206 stores CDRs including information for detecting war dialed calls. Such CDRs are referred to herein as war dialing event detection CDRs. Such CDRs may be generated by correlating some or all of the various call signaling messages associated with the setup and tear down of a call. In an SS7 signaling environment, a war dialed call may be identified by an initial address message followed a short time later by a release message from the calling party. Thus, an SS7-based war dialing event detection CDR may include data extracted from an IAM message and release message. In a SIP signaling environment, a war dialing event detection CDR may include data extracted from an INVITE message and a BYE message in a SIP session. For H.225 calls, a war dialing event detection CDR may include information extracted from a SETUP message and a RELEASE message.

As stated above, a war dialing event detection CDR may include some or all of the information contained within or associated with call signaling messages use to establish and release calls. In one example, a war dialing event detection CDR may include information that is useful in determining whether a call is part of a war dialing event. An example of a war dialing event detection CDR that may be generated by a WDE detection and mitigation system of the present invention is shown below in Table 1.

TABLE 1

| | | | War Dialing Event Detection CDR | | | | | |
|---|---|---|---|---|---|---|---|---|
| ID | Msg | DPC | OPC | CIC | CgPN | CdPN | Date | Time |
| 121 | IAM | 1-1-1 | 2-2-2 | 213 | 9195552323 | 9194691000 | 010203 | 18:14:36 |
| 121 | REL | 1-1-1 | 2-2-2 | 213 | 9195552323 | 9194691000 | 010203 | 18:15:02 |

In Table 1, the war dialing event detection CDR includes a CDR ID field, a message type field, a destination point code (DPC) field, an originating point code (OPC) field, a circuit identification code (CIC) field, a calling party number (CgPN) field, a called party number (CdPN) field, a carrier identification (CID) field, a date field, and a time field. As stated above, the war dialing event detection CDR includes information useful in determining whether a call is part of a war dialing event. In Table 1, this information includes fields from an IAM message and a release message associated with the call. Recording fields from IAM and release messages associated with a call may be useful in detecting war dialing events, since an IAM message is the message that initiates a call and the release message is the message that terminates a call. Since war dialing may involve a short duration call terminated by the calling party, an IAM message followed a short time later by a release message initiated by the calling party may indicate that the call is part of a war dialing event.

In addition to capturing the IAM and release messages, it may also be desirable to capture and include release complete messages (RLC) in war dialing event detection CDRs, as there may be instances where the release message is missed. Therefore the RLC would be detected and the assumption made that the call was released. Also, to prevent the possibility that the call would not be recorded due to the absence of both REL and RLC, if another IAM for the same CIC is detected, the assumption should be made that the previous call was released, and the call duration may be derived from the time of the original IAM and the subsequent IAM for the same CIC.

The present invention is not limited to storing only IAM and release messages. In an alternate implementation, war dialing event detection and mitigation system 200 may store all of the call setup messages associated with a call. For example, for an SS7 call, war dialing event detection and mitigation system 200 may store the IAM message, the address complete message, the answer message, the release message, and the release complete message without departing from the scope of the invention.

War dialing event database 208 may store information for identifying known or suspected war dialing calling parties, as well as information associated with known or suspected war dialed calls. Such war dialing call information may include war dialing calling party identifiers, war dialing event identification numbers, called party numbers, call dates, call origination times, and call termination times. Information in war dialing event database 208 may be derived from known war dialing events detected by WDE detection and mitigation system 200.

Tables 2 and 3 shown below illustrate exemplary data that may be dialing event database 208. Table 2 is war dialer watch list, a war dialed call detail table.

TABLE 2

War Dialer Watch List

| CgPN | Status | Action |
|---|---|---|
| 9195552323 | Confirmed | Block |
| 9195557988 | Suspected | Notify |

TABLE 3

War Dialing Events

| CgPN | Event ID | CdPN | Date | OTime | TTime |
|---|---|---|---|---|---|
| 9195552323 | 00122 | 9194691000 | 010203 | 18:14:36 | 18:15:02 |
| 9195552323 | 00122 | 9194691001 | 010203 | 18:15:10 | 18:15:33 |
| 9195552323 | 00122 | 9194691002 | 010203 | 18:15:46 | 18:15:58 |
| 9195552323 | 00122 | 9194691003 | 010203 | 18:16:06 | 18:16:20 |
| 9195552323 | 18985 | 9194692000 | 010503 | 03:02:05 | 03:02:31 |
| 9195552323 | 18985 | 9194692002 | 010503 | 03:02:45 | 03:03:01 |
| 9195552323 | 18985 | 9194692004 | 010503 | 03:03:12 | 03:03:41 |

The exemplary war dialer watch list (Table 2) includes a war dialer calling party telephone number field, a status indicator field that specifies the degree of certainty associated with a war dialer, and an action identifier field that specifies a mitigation action. The data in Table 1 may be derived from war dialing events detected by war dialing event detection and mitigation system 200.

Table 2 stores war dialing event information collected by WDE detection and mitigation system 200. In Table 2, the war dialing event information is organized using a war dialer calling party telephone number field, a war dialing event identifier field, a called party field, a call date field, a call origination time field, and a call termination time field. The war dialing calling party telephone number field stores calling party numbers extracted from signaling messages associated with war dialed calls. The event ID field stores an identifier generated by war dialing event detection and mitigation system 200 to identify calls associated with the same war dialing event. The called party number field stores directory numbers dialed during war dialing events. The date and time fields in Table 1 store dates and times associated with war dialed calls.

In the examples illustrated in Table 3, the first four rows represent sequentially-dialed, short-duration calls from the same calling party number, which may indicate a war dialing event. Similarly, the last three rows in Table 3 represent another instance of sequentially-dialed, short-duration calls from the same calling party which may indicate another war dialing event.

Exceptions database 210 contains a list of calling party identifiers that are exempt from consideration as war dialers. For example, a telemarketer, a pollster, a census taker, or other legitimate mass caller may be deemed to be a war dialing exception and, as such, may not be subject to war dialing mitigation actions. Such exception data may be manually provisioned by a network operator. Exemplary data contained in the exceptions database 210 is presented below in Table 4.

TABLE 4

War Dialer Exceptions List

| CgPN | ID |
|---|---|
| 9199671300 | Telemarketer |
| 9193802566 | Pollster |

A database administration function 212 receives signaling messages (e.g., SS7 MSUs, SIP messages, etc.) from message I/O function 202 and directs the messages to CDR database 206. Database administration function 212 may screen received signaling messages so as to direct only call-related messages to database 206. For example, in an SS7 network, signaling connection control part (SCCP)

messages may be identified and screened by function 212 to prevent their inclusion in CDR database 206. Database administration function 212 may store information in CDR database 206 for generating war dialing event CDRs, as described above. Database administration function 212 may also maintain and provide read/write access to all of the databases associated with data storage 204.

Data analysis function 214 may include a WDE detection function 216 and a WDE correlation function 218. WDE detection function 216 may analyze information stored in CDR database 206 to identify war dialing events based on CDR data stored in CDR database 206. WDE detection function 216 may scan CDR/MSU data contained in database 206 in search of multiple, short duration calls or call attempts placed from the same calling party number. WDE detection function 216 may additionally analyze the CDR/MSU data for called party number patterns (e.g., sequential number patterns, even numbered patterns, odd numbered patterns, or any other patterns in which called party numbers are related by a mathematical function.) associated with calls or call attempts involving the same calling party. In the event that a suspicious or war-dialing-like calling pattern is detected, function 216 may create or trigger the creation a WDE record that is subsequently included in WDE database 208. The WDE record is created using some or all of the relevant call data stored in CDR database 206.

The WDE records stored in WDE database 208 may be used to detect phase 2 war dialing where the war dialer places calls to numbers of interest located during phase 1 war dialing. In addition, the WDE records in WDE database 206 may be used to confirm war dialing events from the same calling party. In order to perform these functions, WDE correlation function 218 may scan suspected or known war dialing event data contained in WDE database 208 in search of two or more war dialing event records that are similar in some respect. For example, correlation function 218 may analyze WDE data for two or more war dialing events that share a common calling party. Such a finding may provide confirmation that the common calling party is, in fact, a war dialer, and consequently the offending calling party may be identified in WDE database 208 as a confirmed war dialer. Correlation function 218 may also analyze WDE data in search of two or more war dialing events that involve a significant number of the same called party numbers, even if the calling party numbers associated with the events are different. In this case, such a finding may provide confirmation that each of the associated calling party numbers is, in fact, a war dialer, and consequently the offending calling party numbers may all be identified in WDE database 208 as confirmed war dialers.

In yet another mode of analysis, correlation function 218 may select a WDE record from WDE database 208 and scan CDR database 206 for calls by a common calling party to a predetermined number of the same called party numbers associated with the selected WDE record. It is important that such scenarios be detected because, as described above, it is not uncommon for an individual to perpetrate a war dialing attack in two phases. The first phase involves the placement of multiple, short duration calls by a common calling party in order to make a quick assessment of called party numbers. The second phase, which takes place following the initial called party number assessments, involves placing longer duration calls to the called party numbers that the war dialer desires to attack. These second phase calls may be placed from different calling party numbers and may last longer than the initial calls. The second phase calls may represent further probing of the called party numbers or may be actual exploitation of the targeted called parties. It is these second phase calls or call attempts that this mode of analysis is intended to detect or correlate.

In addition to detecting phase 2 war dialing, war dialing event detection and mitigation system 200 may also capture the calling party's category parameter from the IAM to determine if the call was made from a pay phone or not. Another parameter of interest that may be captured is the Geodesic Location Identifier Parameter and its associated data in the event that the war dialer is using a laptop with wireless modem. This will provide location information for the war dialer if the modem is equipped with GPS transceivers. This data may then be provided to a mapping function should the operator wish to locate the war dialer and/or implement real-time trace of the call.

In addition to analyzing CDR and WDE data, detection function 216 and correlation function 218 may also trigger war dialing mitigation actions performed by mitigation function 220. Mitigation function 220 may include an alarm or notification message generation function 222 and a signaling intervention function 224. Notification message generation function 222 may monitor WDE database 208 and process new WDE records as they are added to the database. Using the example presented above in Tables 2 and 3, each time a new entry is added to the WDE data structure, notification message generation function 222 may examine the mitigation action field and determine if a notification action is indicated. In the event that a notification action is required, notification message generation function 222 may generate and transmit a notification message, which indicates that a suspected or confirmed war dialing incident has occurred. Notification message formats may include SS7, such as SCCP and transaction capabilities application part; SIP; electronic mail; short message service (SMS); or other suitable formats. With regard to the triggering of notification function processing, notification message generation function 222 may also be triggered directly by detection function 216. In either case, notification function processing is similar to that described above.

Signaling intervention function 224 may discard a call setup signaling message associated with a suspected or confirmed war dialing calling party, and by doing so, prevent the war dialing calling party from completing a call. Alternatively, signaling intervention function 224 may generate and insert into a signaling network a signaling message that causes the termination of a call (e.g., an SS7 REL message). As described above with respect to notification message generation function 222, signaling intervention function 224 may monitor WDE database 208 and process new WDE records as they are added to the database. Once again using the example presented above in Tables 2 and 3, each time a new entry is added to the WDE data structure, signaling intervention function 224 may examine the mitigation action field, and determine if a signaling intervention or blocking action is indicated. Signaling intervention function 224 may also be triggered directly by correlation function 218 in response to the identification of a correlation between two or more war-dialing events in WDE database 208. In either case, signaling intervention processing may be similar to that described above.

In addition to performing call blocking, signaling intervention function 224 may re-route war dialed calls to a security function or any other configurable number. Re-routing war dialed calls may include intercepting call signaling messages on-the-fly, replacing the original called party routing information with security function routing information and forwarding the call signaling messages to the security function. In addition, as discussed above, war dialed callers may be added to the war dialer watch list to be used in detecting future war dialing events. Thus, the present invention includes automatically populating a war dialer watch list based on detected war dialing events.

Stand-Alone Implementation of WDE Detection System

Figure 1:
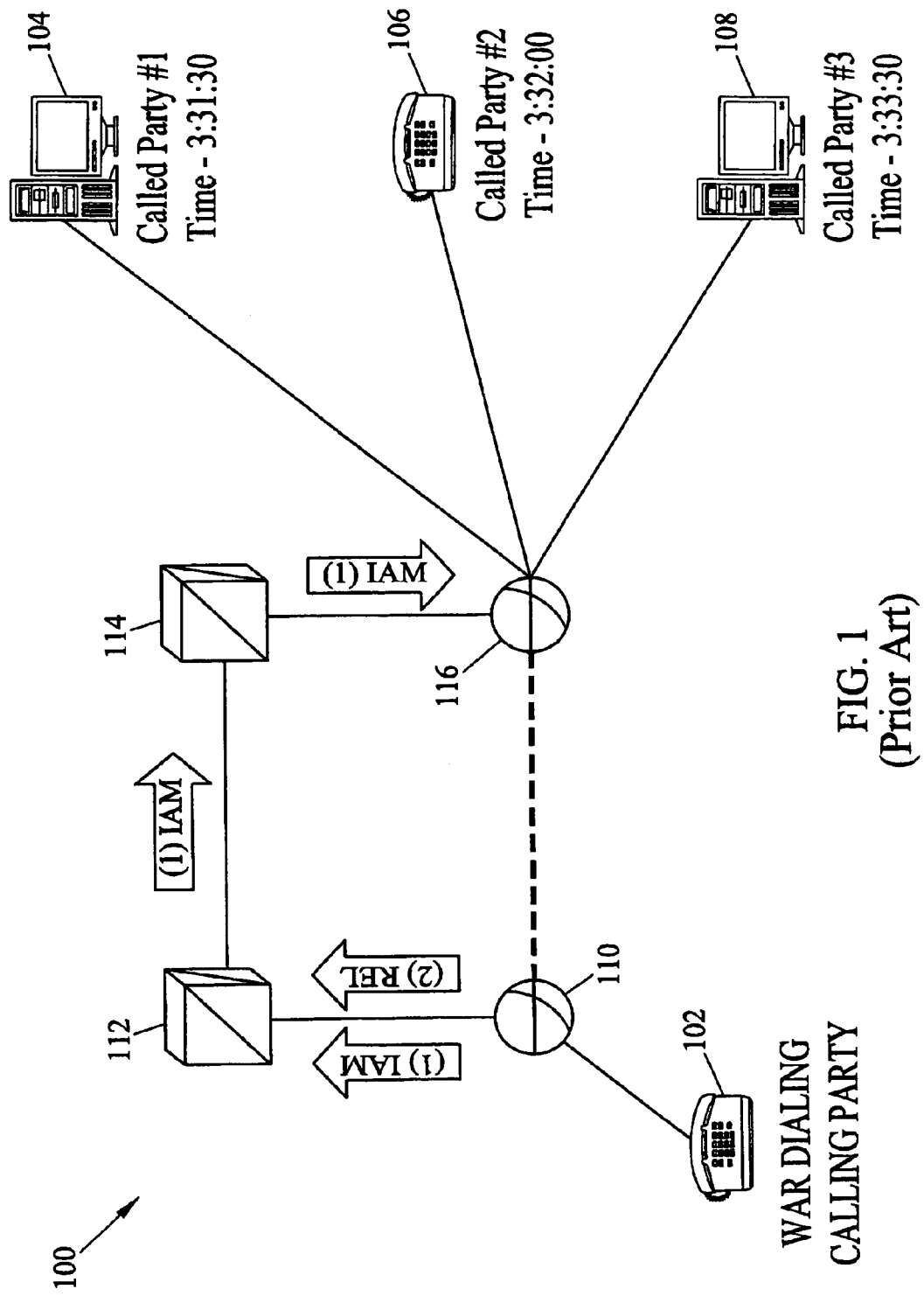
FIG. 1 is a network diagram that illustrates a signaling message flow associated with an exemplary war dialing event.
Figure 3:
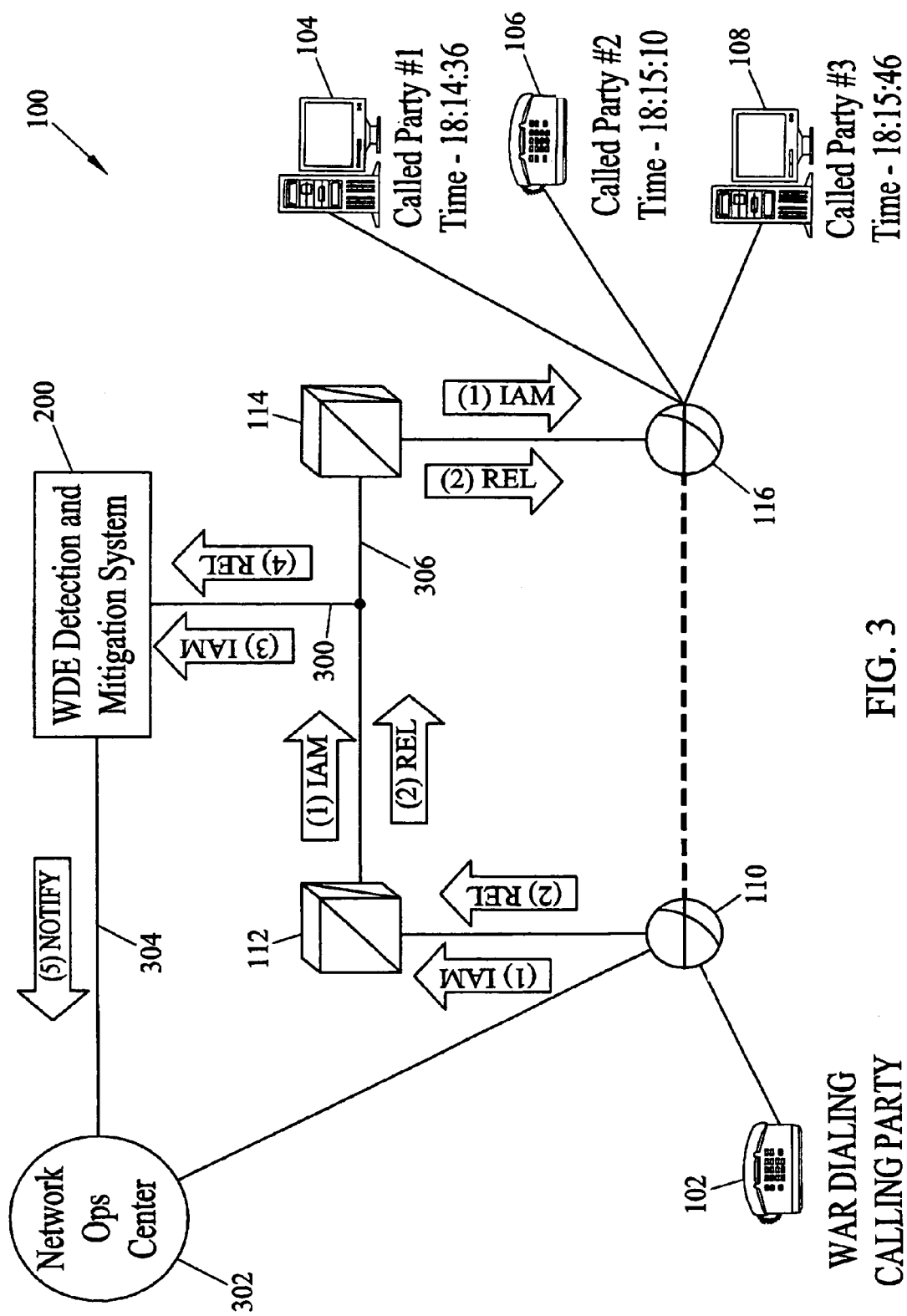
FIG. 3 is a network diagram illustrating the stand-alone WDE detection and mitigation system of FIG. 2 in a signaling network environment according to an embodiment of the present invention.

FIG. 3 is a block diagram illustrating stand-alone WDE detection and mitigation system 200 in a signaling network environment according to an embodiment of the present invention. More particularly, FIG. 3 illustrates an exemplary SS7 signaling network environment 100, similar to that described above with respect to FIG. 1. In FIG. 3, stand-alone WDE detection and mitigation system 200 may monitor one or more signaling links in a telecommunications signaling network, such as a signaling system 7 (SS7) signaling network, via signaling link probe 300. Signaling link probe 300 may be implemented using any suitable network monitoring device capable of non-intrusively copying signaling messages from SS7 signaling links. An example of such a device is the i2000 or i3000 shelf available from Tekelec of Calabasas, Calif. Additional examples include the External Monitoring Shelf (EMS) as part of the Tekeserver™ platform available from Tekelec of Calabasas, Calif. or external signaling link probes available from Steleus of Westford, Mass.

In an alternate embodiment, stand-alone WDE detection and mitigation system 200 may monitor signaling link traffic in a network by receiving copies of signaling messages directly from another element in the network, such as an SS7 signal transfer point (STP), an SS7-IP signaling gateway, a SIP proxy server, an end office facility, a tandem office facility, or a mobile switching center (MSC). In yet another embodiment, stand-alone WDE detection and mitigation system 200 may receive CDRs from another monitoring/CDR generation system located in or associated with the signaling network. CDRs may also be collected directly from switches without departing from the scope of the invention.

Network environment 100 shown in FIG. 3 includes a network operations center 302, which is connected to WDE detection and mitigation system 200 via a communication link 304. Communications link 304 may be any suitable type of communications link, such as an Internet protocol (IP) link, an asynchronous transfer mode (ATM) link, an SS7 link, or a wireless link. WDE detection and mitigation system 200 may monitor signaling message traffic on SS7 signaling link 306 via signaling link probe 300. While only a single signaling link 306 (and associated signaling link probe 300) is illustrated in this example, multiple signaling links may be simultaneously monitored using multiple link probes without departing from the scope of the invention.

As described above with respect to FIG. 1, the first phase of a typical war dialing event involves the placement of multiple, short duration calls (or call attempts) by the same calling party. The calls may reflect a regular called party number pattern or may be random in nature. In any event, call setup signaling messages associated with each call or call attempt are transmitted through a signaling network infrastructure, such as the illustrated SS7 signaling network. In the exemplary call scenario illustrated in FIG. 3, war dialing party 102 dials a directory number, which triggers end office 110 to generate and transmit an IAM message to called party end office 116. The IAM message is received by signal transfer point 112 and routed to STP 114 via signaling link 306. Signaling link probe 300 copies the IAM message without disrupting transmission of the original message. The copied IAM message is received by WDE detection and mitigation system 200 via message I/O function 202 illustrated in FIG. 2.

The original IAM message is routed by STP 114 to end office 116, and a call is eventually established between the war-dialing calling party 102 and called party 104. After a period of time when the war dialing calling party 102 has initially assessed the targeted called party, the war dialing calling party terminates the call (i.e., hangs up). In response to the call termination, end office 110 generates and transmits an ISUP REL message. In a manner similar to that described above with respect to the IAM message, the REL message is routed via STP 112 over link 306 to STP 114 and ultimately to terminating end office 116. Link probe 300 copies the release message and sends the copy to WDE detection and mitigation system 200. Other messages, such as ACM, ANM, and RLC messages, may be exchanged between end offices 110 and 116. These messages may be ignored by WDE detection and mitigation system 200, since they may not be necessary to detect calls associated with war dialing events.

Figure 4:
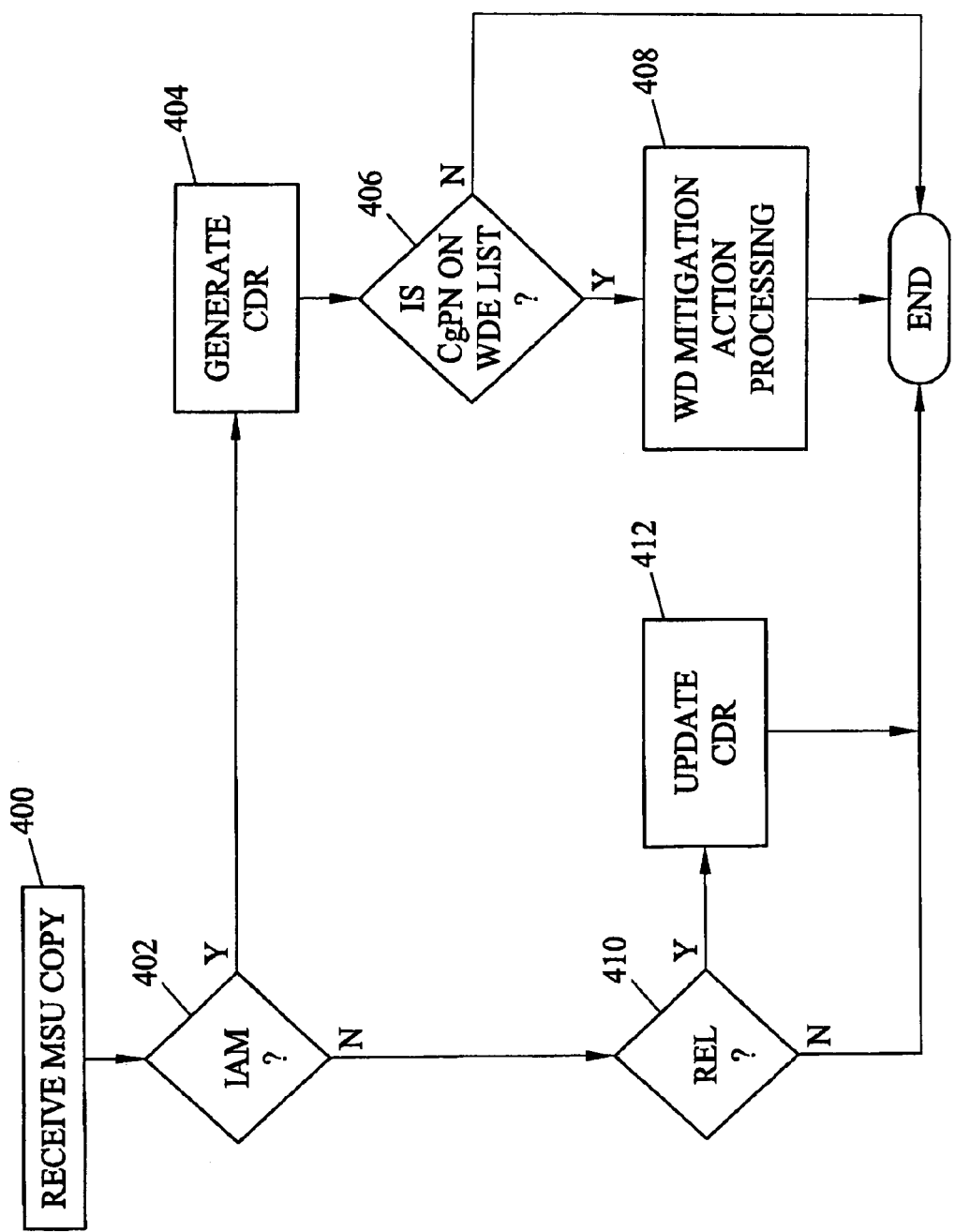
FIG. 4 is a flow chart illustrating exemplary steps performed by a WDE detection and mitigation system in generating war dialing event detection CDRs and detecting calls from known war dialers according to an embodiment of the present invention.

FIG. 4 is a flow chart illustrating exemplary steps that may be performed by WDE detection and mitigation system 200 in generating war dialing event detection CDRs and detecting calls from known war dialers according to an embodiment of the present invention. Referring to FIG. 4, in step 400, I/O function 202 receives a message copied by link probe 300. In step 402, database administration function 212 determines whether the message is an IAM message. If the message is an IAM message, control proceeds to step 404 where database administration function 212 generates a new CDR entry in CDR database 206. In step 406, WDE detection function 216 examines the new CDR entry and determines whether the calling party number for the call is contained in WDE database 208. If the calling party number is contained in database 208, control proceeds to step 408 where war dialing mitigation processing is performed.

Returning to step 402, if the received message is not an IAM message, control proceeds to step 410 where it is determined whether the message is a release message. If the message is a release message, control proceeds to step 412 where the release message is used to update a previously opened CDR for the call. In step 410, if the message is not a release message, war dialing event detection CDR generation ends.

The present invention is not limited to a WDE detection and mitigation system that includes a CDR generator. In an alternate embodiment of the invention, a separate or external CDR generator may be used to provide CDR data to WDE detection and mitigation system 200. If CDRs are provided by an external system, WDE detection and mitigation system 200 may scan the CDRs to detect war dialing events.

Figure 5:
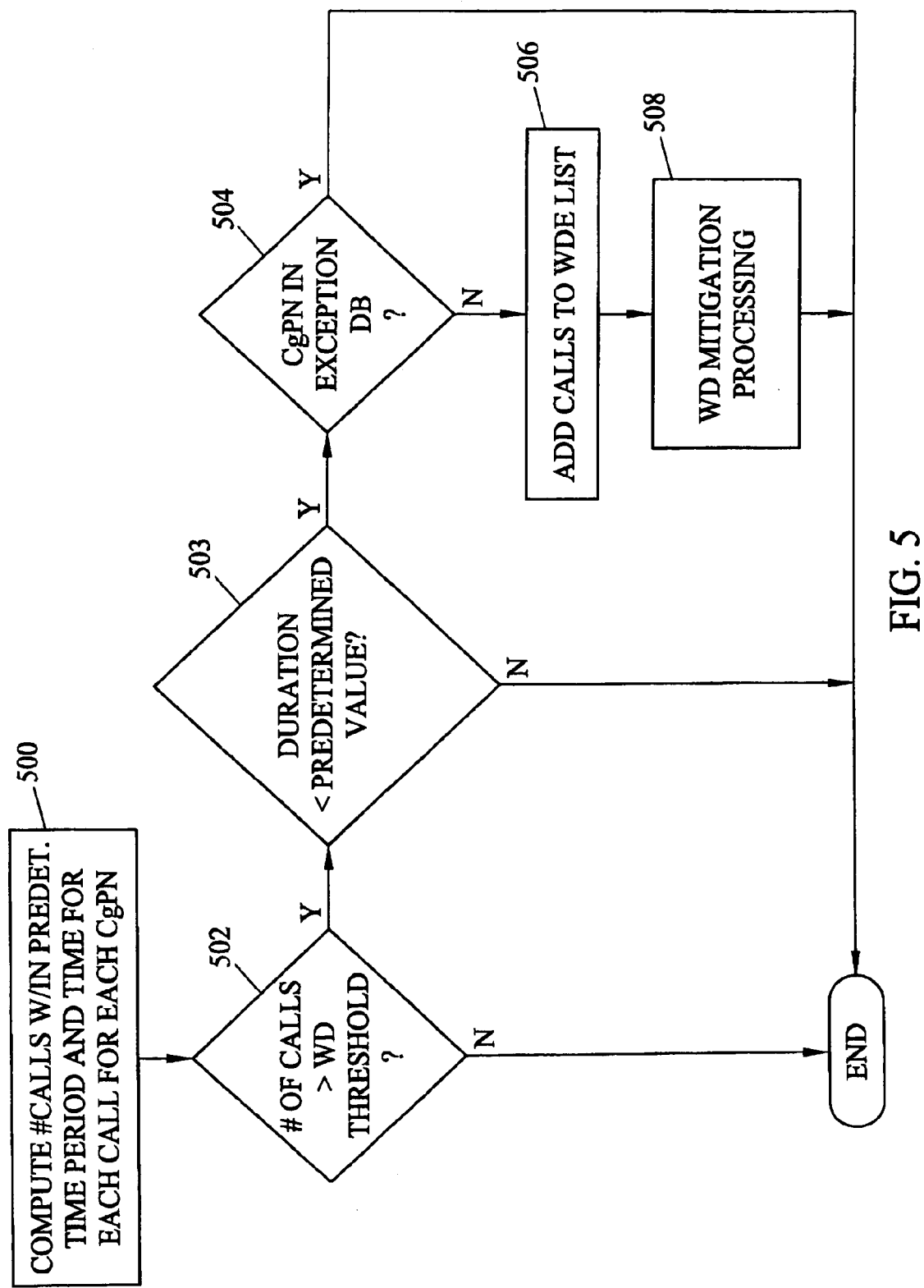
FIG. 5 is a flow chart illustrating exemplary steps for detecting a war dialing event based on war dialing event detection CDRs according to an embodiment of the present invention.

FIG. 5 is a flow diagram that illustrates exemplary processing by WDE detection function 216 in detecting war dialing events based on CDRs stored or generated by WDE detection and mitigation system 200. This processing may be performed each time a new entry is added to CDR database 206, each time an existing CDR entry is updated, or at predetermined time intervals. In this example of WDE detection processing, CDR entries in database 206 are sorted and grouped by CgPN. The number of calls for each CgPN within a predetermined time period, along with the duration of the calls for each CgPN are calculated, as indicated in step 500. The predetermined time period over which these statistics are calculated may be user configurable based on past or expected war dialing event characteristics. For example, the number of calls for each CgPN and average call duration may be calculated over one-hour spans of CDR data. A network operator may subsequently determine that such calculations over thirty-minute time spans are more useful for the particular type of war-dialing attacks they are experiencing. Thus, the time interval for computing war dialing statistics is preferably programmable by the network operator.

In step 502, it is determined whether the number of calls from each calling party number exceeds a war dialing threshold. This number may be programmable by the network operator. If the number of calls exceeds the war dialing threshold, control proceeds to step 503 where it is determined whether the duration of the calls is less than a predetermined value. For example, step 503 may include determining whether the average duration of each call is less than a predetermined value or whether a certain number of the calls have durations less than a predetermined value.

If the duration value or values in step 503 is less than the predetermined value that indicates war dialing, control proceeds to step 504 where it is determined whether the calling party number is in the exceptions database. If the calling party number is not in the exceptions database, control proceeds to step 506 where the calls are added to a war dialing event list. In step 508, war dialing mitigation processing is performed.

Returning to step 502, if the number of calls does not exceed the threshold, war dialing processing ends. Similarly, in step 503, if the duration value or values is not less than the predetermined value, war dialing processing ends. In step 504, if the calling party is in the exceptions database, war dialing processing ends. Thus, by using an exceptions database to exclude calls that are known not to be associated with war dialing events, the steps illustrated in FIG. 5 detect war dialing with a reduced likelihood of false positives.

As described above, in addition to or instead of collecting call duration statistics, patterns of called party numbers dialed by the same CgPN may also be analyzed and used to determine whether a group of calls made by a common CgPN should be added to the WDE database 208. Called party number patterns may include incrementally ascending or descending telephone number sequences or patterns in which called party numbers are related by a mathematical function. For the simplicity of illustration and explanation, only the call volume and duration statistical analysis approach is illustrated in FIG. 5. However, detecting called party number patterns may be an added or performed instead of the steps illustrated in FIG. 5 without departing from the scope of the invention.

Figure 6:
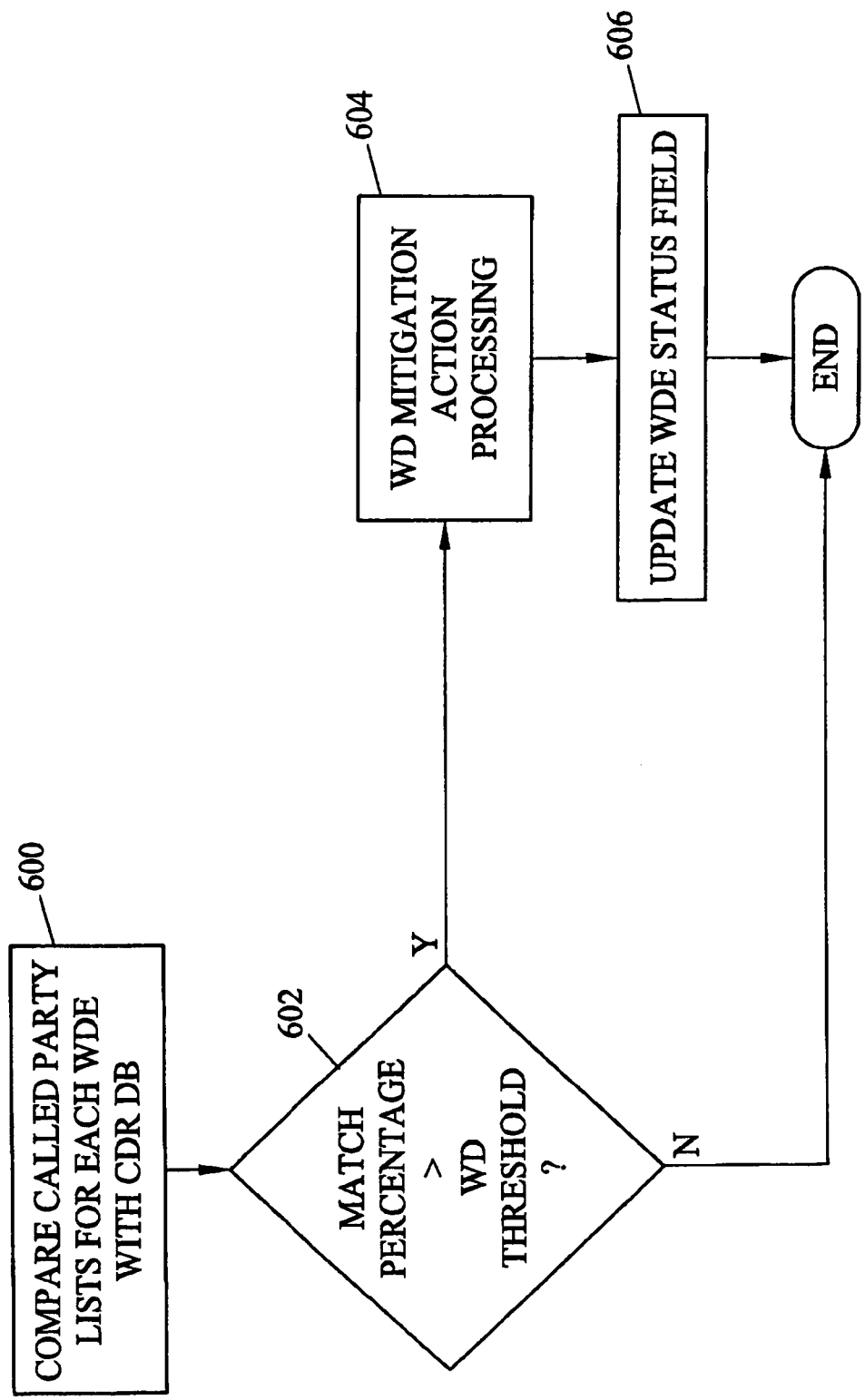
FIG. 6 is a flow chart illustrating exemplary steps for detecting and mitigating phase 2 war dialing according to an embodiment of the present invention.

In addition to detecting initial or phase 1 war dialing events by a calling party attempting to locate systems for further analysis, the present invention also includes methods and systems for detecting follow up calls by war dialing calling parties. As described above, these follow up calls are referred to herein as phase 2 war dialing events. FIG. 6 is a flow chart that illustrates exemplary processing by WDE correlation function 218 in detecting and mitigating phase 2 war dialing events according to an embodiment of the present invention. This processing may be performed each time a new entry is added to CDR database 206, each time an existing CDR entry is updated, or at predetermined time intervals. As indicated in step 600, correlation function 218 selects a WDE record from WDE database 208 and scans CDR database 206 for calls by a common calling party to a predetermined number of the same called party numbers associated with the selected WDE record. In one implementation, the fraction of matching or common called party numbers is calculated and compared to a threshold value (step 602). Other calculated metrics or statistics may be used to determine whether it is probable that the second phase of a war dialing attack is occurring or has occurred. In any event, if it is determined that a war dialer is re-dialing at least some of the same called party numbers that were previously assessed or probed during the initial phase of an attack, a mitigating action may be invoked (e.g., call blocking and/or notification message generation), as indicated in step 604. Also, the status field of the relevant WDE entry may be updated to indicate that the CgPN has been confirmed as a war dialing attacker (606).

Integrated Node Implementation of WDE Detection System

Figure 7:
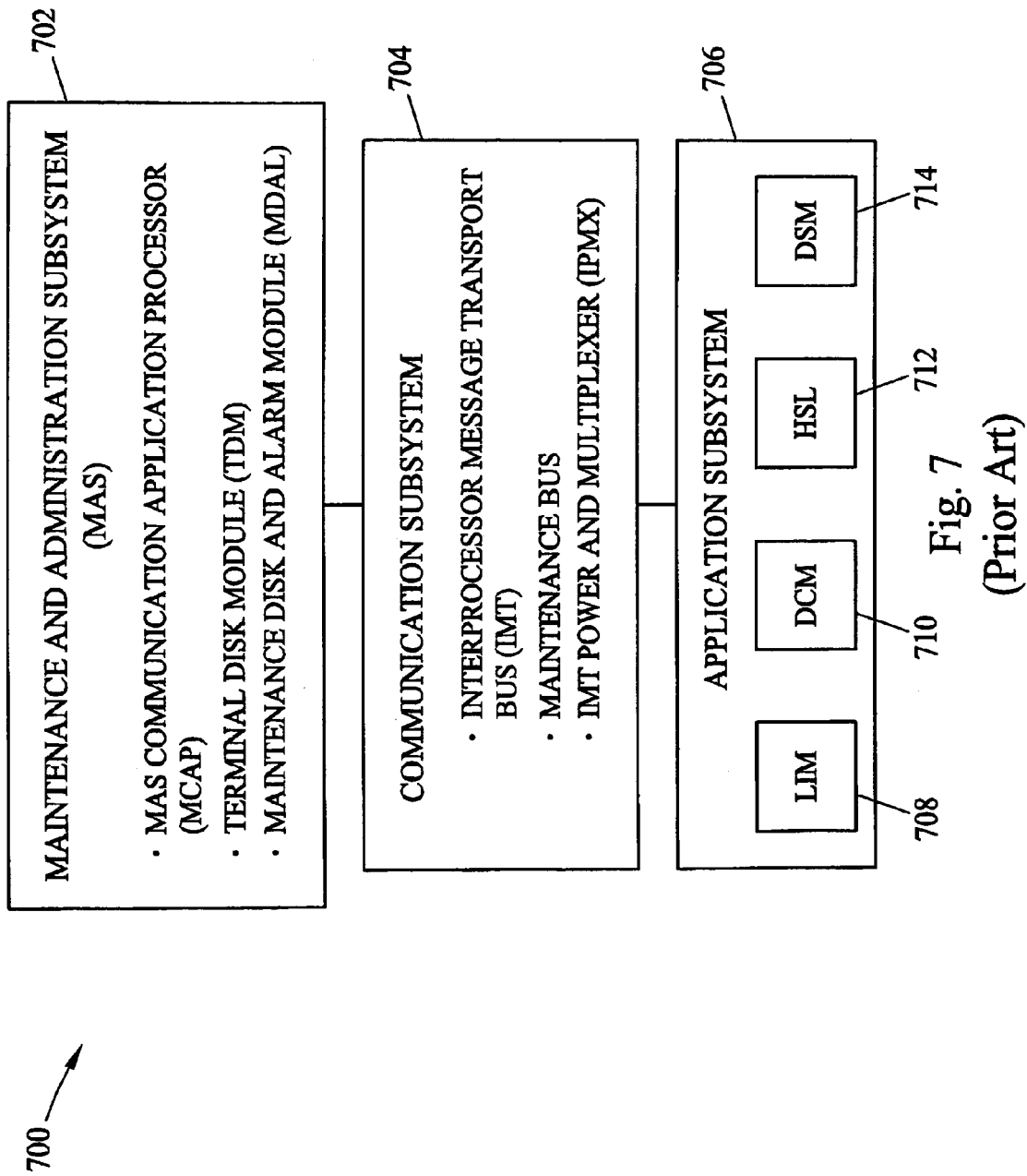
FIG. 7 is a block diagram of an internal architecture of an IP-capable STP suitable for use with embodiments of the present invention.

As described above, a WDE detection system may include components that are part of a signaling message routing node, such as a signal transfer point or a signaling gateway. FIG. 7 is a block diagram illustrating an exemplary STP 700, which employs a distributed, multi-processor system architecture suitable for use with embodiments of the present invention. As shown in FIG. 7, STP 700 includes the following subsystems: a maintenance and administration subsystem (MAS) 702, a communication subsystem 704 and an application subsystem 706. MAS 702 provides maintenance communications, initial program loading, peripheral services, alarm processing and system disks. Communication subsystem 704 includes an interprocessor message transport (IMT) bus. The IMT bus facilitates communication among the various modules and subsystems within the routing node. In one exemplary implementation, the IMT bus includes two 1 Gbps counter-rotating serial rings. In an alternate implementation, communication subsystem 704 may include a local area network, such as an Ethernet, for connecting the modules and subsystems with STP 700.

Application subsystem 706 includes application cards or printed circuit boards capable of communicating with the other cards through the IMT communications bus or network. Numerous types of application cards can be included in STP 700. Exemplary application cards include an SS7 link interface module (LIM) 708 that provides SS7 links and X.25 links, a data communication module (DCM) 710 that provides an Internet protocol (IP) signaling interface to external nodes, and a high-speed asynchronous transfer mode (ATM) communication link module (HSL) 712. A database services module (DSM) 714 may host one or more signaling message processing applications, such as global title translation, flexible routing, or number portability translation.

A WDE detection and mitigation system of the present invention may detect war dialing events based on ISDN user part (ISUP) messages as well as IP-encapsulated ISUP signaling messages, such as Internet Engineering Task Force (IETF) SIGTRAN M3UA protocol messages. WDE detection and mitigation system 200 may also process other non-SS7 signaling protocol messages, such as SIP signaling messages, media gateway control protocol (MGCP) signaling messages, MEGACO signaling messages, H.225 signaling messages, and the like.

Figure 8:
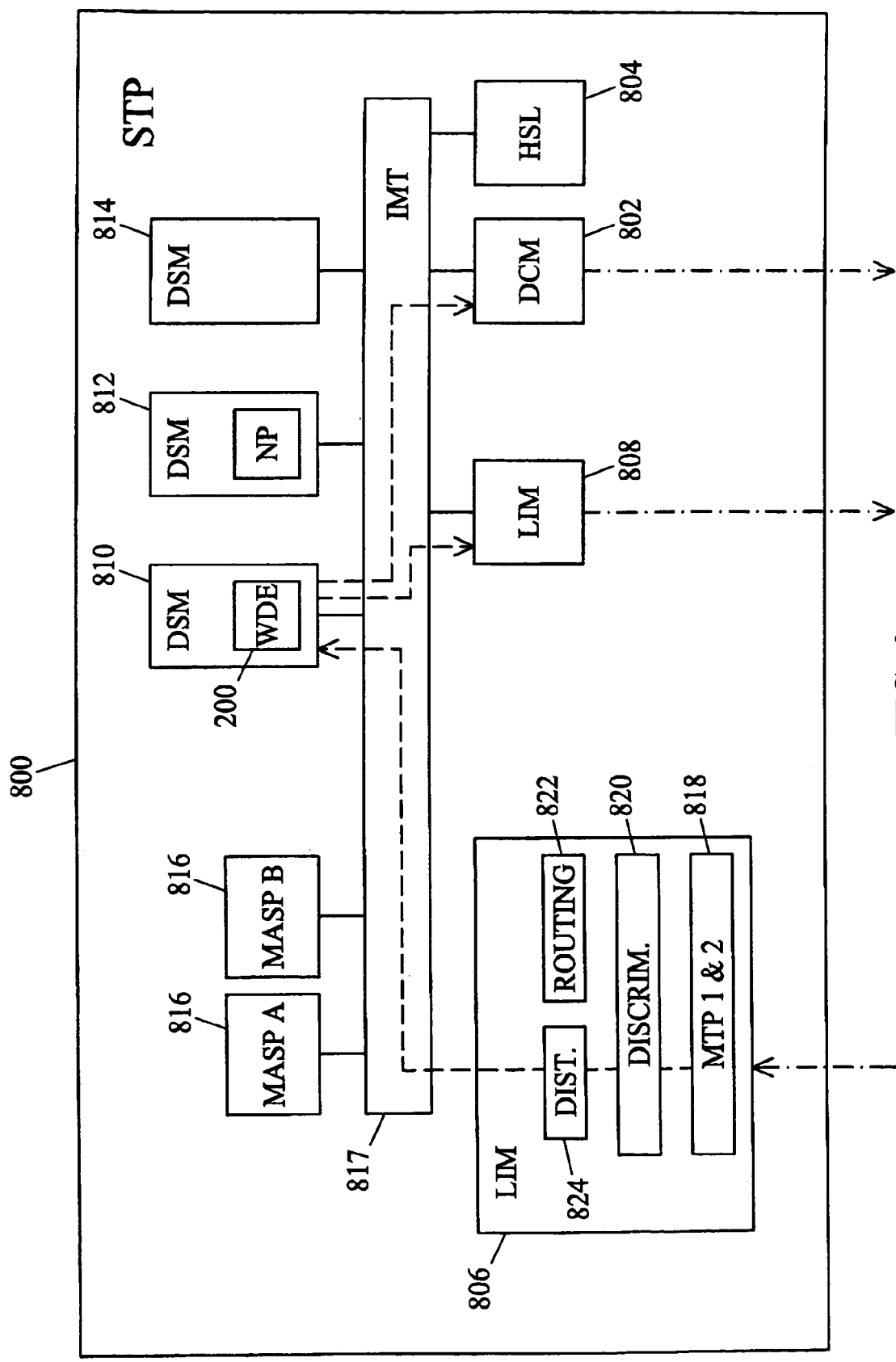
FIG. 8 is block diagram of an IP-capable STP including an internal WDE detection and mitigation system according to an embodiment of the present invention.

FIG. 8 illustrates a routing node 800 including a WDE detection and mitigation system located on a database services module according to an embodiment of the present invention. In FIG. 8, STP 800 includes an IP-capable DCM 802, an ATM-capable HSL communication module 804, a pair of SS7 LIMs 806 and 808, a plurality of DSMs 810, 812, and 814 and MASPs 816. Modules 802–816 may be connected to each other by IMT bus 817. The modules may include processing capabilities similar to those described above with respect to FIG. 7.

DSM 422 may include a WDE detection and mitigation system 200 according to an embodiment of the present invention. WDE detection and mitigation system 200 residing on DSM 422 may operate in the same manner as the example described above with respect to FIG. 2.

In FIG. 8, a single DSM is provisioned to provide WDE detection and mitigation functionality within routing node 800. However, multiple DSMs with WDE detection and mitigation functionality may be simultaneously deployed within routing node 800 without departing from the scope of the invention.

LIMs 806 and 808 communicate with other nodes via external SS7 signaling links. As such, each LIM may be connected to other signaling points in a network via one or more individual SS7 signaling links, where an SS7 signaling link is typically a 56 kbps or 64 kbps DSO link. Multiple signaling links connected to a common destination may be grouped into a virtual entity known as an SS7 signaling linkset.

DCM 802 includes IP transport capabilities. DCM 802 may be connected to external nodes via one or more IP-based signaling linksets. DCM 802 may transmit any type of signaling messages over the IP based signaling linksets. Examples of signaling messages that may be transmitted over IP signaling links by DCM 802 include SS7 signaling messages, SIP signaling messages, and H.225 signaling messages. Such IP signaling links and messages may be used to facilitate the communication of WDE notification messages to other nodes or service centers in a network.

As illustrated in FIG. 8, LIM 806 includes an SS7 MTP level 1 & 2 function 818, a message discrimination function 820, a routing function 822 and a message distribution function 824. MTP level 1 and 2 function 818 provides the facilities necessary to send and receive digital data over a particular physical medium, as well as to provide error detection, error correction and sequenced delivery of SS7 messages. Message discrimination function 820 receives signaling messages from the lower processing layers and performs a discrimination function that determines whether an incoming SS7 message requires internal processing or is simply to be through switched. In one exemplary implementation, discrimination function 820 may perform a WDE pre-screening function to identify messages as candidates for WDE detection and mitigation processing. For example, discrimination function 820 may examine the SI and ISUP message type parameters to identify ISUP IAM and REL messages as candidates for WDE detection and mitigation processing. In an alternate implementation, discrimination function 820 may determine whether a signaling message is a candidate for WDE detection and mitigation processing based on the signaling link or signaling linkset on which the message is received.

DCM 802 may also include a discrimination function that identifies IP-based signaling messages as candidates for WDE application processing. For IP-based SS7 signaling messages, the discrimination function on DCM 802 may examine the same parameters that discrimination function 820 on LIM 410 examines. For other types of signaling messages, DCM 802 may examine parameters that determine whether the message type is an initial call signaling message or a terminating call signaling message and therefore a candidate for WDE application processing. For example, for SIP messages, the discrimination function on DCM 802 may identify INVITE and BYE messages as candidates for WDE detection and mitigation processing. For H.225 messages, the discrimination function on DCM 802 may identify CONNECT and RELEASE messages as candidates for WDE application processing. Subsequent WDE screening of the identified candidates may be performed by the discrimination function on DCM 802 or by WDE system 200 on DSM 422, as described in detail below.

For received signaling messages that require MTP routing, routing function 822 is responsible for examining these messages and determining the outbound SS7 signaling link or IP signaling link over which these messages are to be transmitted. Routing function 822 may transmit the messages to the outbound communication module (e.g., LIM, DCM, HSL) associated with the selected signaling link via IMT bus 817.

If discrimination function 820 determines that a received signaling message requires processing by an internal application or associated subsystem of STP 800, such as WDE detection and mitigation system 200, then the message is passed to message distribution function 824. An associated subsystem may be an adjunct message processing platform, such as a computer workstation or server, that is connected to the routing node via an external communication connection, such as an Ethernet connection. For example, discrimination function 820 may determine that a received SS7 signaling message requires WDE application processing if the message includes an SI parameter value of 5, indicating that the message is an ISUP message. In one implementation, discrimination function 820 may decode the ISUP parameters in the signaling message to produce a decode key and forward the decode key along with the signaling message to DSM 810 via IMT bus 817. The decode key may contain ISUP parameters stored in fixed fields in a decode key header that may be attached to the message, as described in commonly-assigned, co-pending U.S. patent application Ser. No. 10/427,491, the disclosure of which is incorporated herein by reference in its entirety.

With regard message discrimination and distribution, discrimination function 820 may generate a copy of a received message that requires WDE processing and pass the message copy to distribution function 824 for delivery to WDE detection and mitigation system 200. The original received message may then be passed to function 822 for routing.

WDE processing performed by DSM 810 may be similar to the WDE detection and mitigation processing described above with respect to FIG. 2. Hence, a description thereof will not be repeated herein. Upon completion of WDE processing, messages may be directed from DSM 810 to an outbound LIM or DCM module via IMT bus 817, as indicated by the dashed arrows in FIG. 8.

The present invention is not limited to the specific architecture illustrated in FIG. 8. Multiple LIMs, DCMs, HSLs, DSMs, and other types of communication and processing modules may be included without departing from the scope of the invention.

Figure 9:
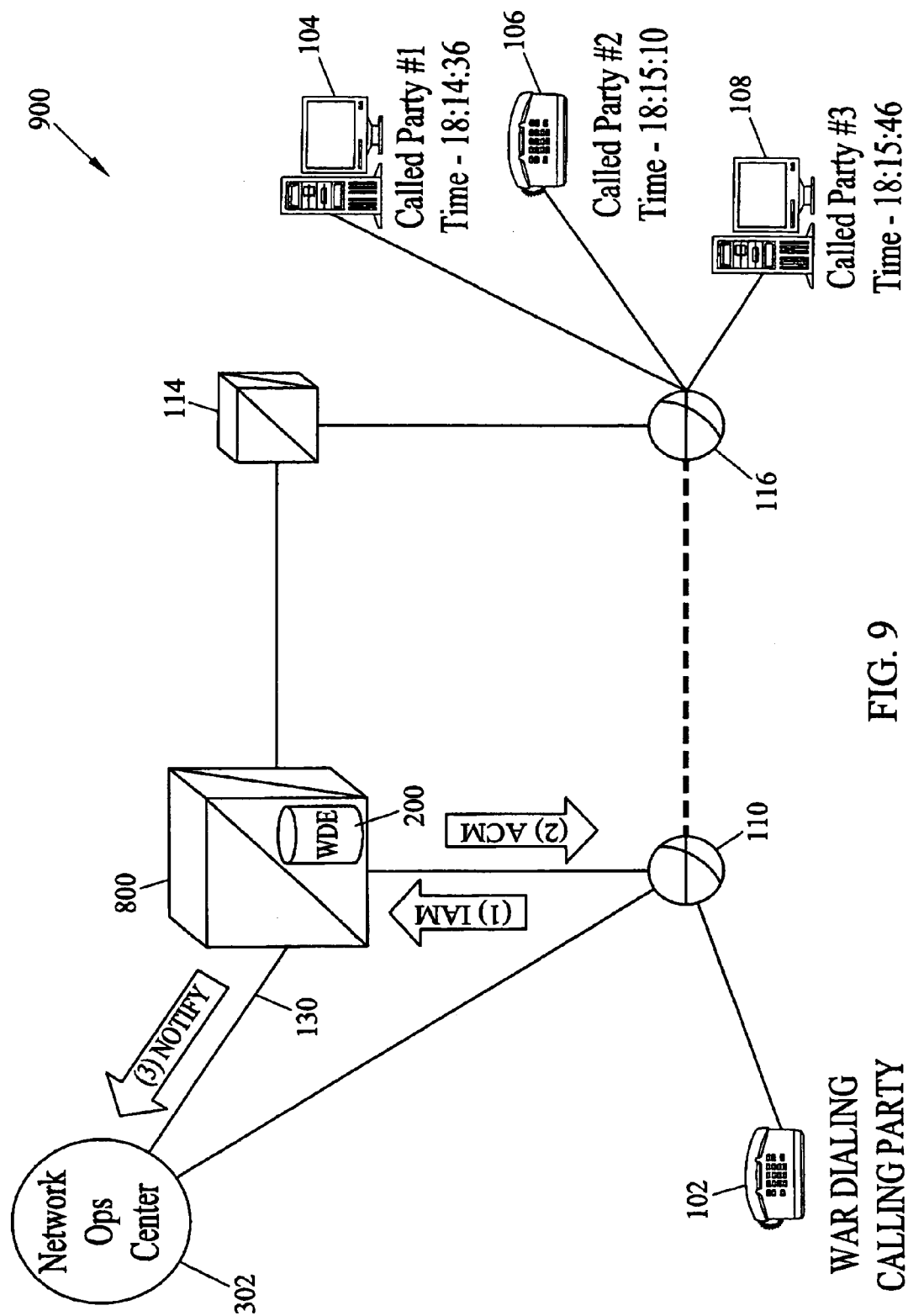
FIG. 9 is a network diagram illustrating an exemplary SS7 signaling network including an IP-capable-STP-based WDE detection and mitigation system according to an embodiment of the present invention.

FIG. 9 illustrates a communications network environment 900 including STP 800 with integrated WDE detection and mitigation system 200. For purposes of illustration, in the signaling scenario depicted in FIG. 9, it is assumed that calling party 102 has been previously identified as a confirmed war dialer and that all call attempts by calling party 102 are to be blocked. When calling party 102 initiates a call, STP 800 receives an IAM message from originating end office 110, indicating that calling party 102 is attempting to place a call. Upon receipt of the IAM message, STP 800 forwards the message to WDE detection and mitigation system 200.

WDE detection and mitigation system 200 creates a new CDR for the IAM message and checks the WDE database. The database check indicates calling party 102 has been previously identified as a confirmed war-dialer (i.e., status="confirmed"), and that all call attempts by calling party 102 are to be blocked (i.e., action="block"). As such, a notification message is generated and transmitted to network operations center 302, alerting network operators to the war-dialing event.

In this example, WDE detection and mitigation system 200 also generates an ISUP address complete message (ACM) that includes a cause code. The cause code indicates that the call attempt cannot be completed. The ACM message is routed from STP 800 back to the originating end office 110, and, as such, the call attempt is blocked.

The present invention is not limited to sending an ACM with a call blocking cause code in order to block calls. Other SS7 signaling messages may be generated by WDE detection and mitigation system 200 and used to provide a similar result (i.e., call block). For example, WDE detection and mitigation system 200 may generate an ISUP confusion (CFN) message with an appropriate cause code. Other functionally analogous messages exist in SIP, H.225 and may be similarly used by a WDE detection and mitigation system 200 invention to facilitate the blocking of a call. In another example, an integrated WDE detection and mitigation system may simply discard a received ISUP IAM message that is associated with a confirmed war dialing calling party, and thereby block the call attempt. In yet another example, if a call has already been established (i.e., call setup is initially allowed) and it is subsequently determined that the calling party is a war dialer, WDE detection and mitigation system 200 may generate an ISUP REL message, which is routed back to the originating end office, thereby causing the call to terminate.

Thus, the present invention includes methods and systems for detecting and mitigating war dialing events. In one method, detecting a war dialing event includes detecting a predetermined number of short duration calls from the same calling party. If a war dialing event is detected, a war dialing mitigation action may be performed.

The present invention may also include methods and systems for detecting phase 2 war dialing. Detecting phase 2 war dialing may include detecting follow up calls from a war dialing calling party. Detecting follow up calls may include comparing calls made by a suspected war dialer to the same called party numbers in a previously detected war dialing event. If phase 2 dialing is detected, calls may be blocked, and a network operations center may be notified.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for detecting a war dialing event in a telecommunications network, the method comprising:
    (a) analyzing signaling messages associated with calls being made or attempted in a telecommunications network;
    (b) based on the signaling messages, determining whether a war dialing event has occurred or is in progress; and
    (c) in response to determining that a war dialing event has occurred or is in progress, performing a war dialing event mitigation action.

2. The method of claim 1 wherein analyzing signaling messages includes correlating the signaling messages into war dialing event detection call detail records including information usable for detecting war dialing events.

3. The method of claim 2 wherein correlating the call signaling messages into war dialing event detection call detail records includes storing predetermined parameters from call signaling messages used to initiate and terminate calls.

4. The method of claim 1 wherein analyzing signaling messages includes comparing calling party information in the signaling messages to war dialing event information stored in a database.

5. The method of claim 1 wherein determining whether a war dialing event has occurred or is in progress includes receiving a call signaling message, extracting calling party information from the call signaling message, and determining whether the calling party is a confirmed war dialer.

6. The method of claim 1 wherein determining whether a war dialing event has occurred or is in progress includes determining whether the signaling messages indicate a plurality of short duration calls from the same calling party within a predetermined time period.

7. The method of claim 1 wherein determining whether a war dialing event has occurred or is in progress includes detecting patterns of calls from the same calling party.

8. The method of claim 7 wherein detecting patterns of calls includes detecting sequences of called party numbers dialed by the same calling party.

9. The method of claim 7 wherein detecting patterns of calls includes detecting called party numbers dialed by the same calling party, wherein the called party numbers are related to each other by a mathematical function.

10. The method of claim 1 wherein determining whether a war dialing event has occurred or is in progress includes determining whether a calling party number is in a predetermined war dialing exceptions list, and, in response to determining that the calling party number is in the exceptions list, determining that a war dialing event has not occurred.

11. The method of claim 1 wherein determining whether a war dialing event has occurred or is in progress includes determining whether a war dialing calling party is making follow up calls to a previous war dialing event.

12. The method of claim 11 wherein determining whether the war dialing calling party is making follow up calls includes comparing data extracted from call setup messages associated with the follow up calls to data extracted from call setup messages associated with initial calls made by the war dialing calling party.

13. The method of claim 1 wherein performing a war dialing event mitigation action includes generating a notification message in response to a war dialing event and sending the notification message to a network operations center.

14. The method of claim 1 wherein performing a war-dialing event mitigation action includes rerouting a call associated with the war dialing event.

15. The method of claim 1 wherein performing a war dialing event mitigation action includes blocking a call associated with the war dialing event.

16. The method of claim 15 wherein blocking the call includes sending a call signaling message to an end office associated with a war dialing calling party to block the call.

17. The method of claim 16 wherein sending a call signaling message includes sending an ISUP address complete message (ACM) message to the end office, the address complete message including a cause code indicating that the call was blocked due to detection of a war dialing event.

18. The method of claim 16 wherein sending a call signaling message includes sending an ISUP confusion (CFN) message to the end office, the CFN message including a cause code indicating that the call was blocked due to detection of a war dialing event.

19. The method of claim 16 wherein sending a call signaling message includes sending an ISUP release (REL) message to the end office, the release message including a cause code indicating that the call was blocked due to detection of a war dialing event.

20. The method of claim 16 wherein sending a call signaling message includes sending an IP telephony call signaling message to the end office, the IP telephony call signaling message including a cause code indicating that the call was blocked due to detection of a war dialing event.

21. The method of claim 15 wherein blocking the call includes discarding a call signaling message used to set up the call.

22. The method of claim 1 comprising automatically populating a war dialer watch list based on detected war dialing events.

23. A system for detecting and mitigating the war dialing events, the system comprising:
  (a) a war dialing event database for storing information associated with known or suspected war dialing calling parties;
  (b) a call detail record database for storing call detail records including call information usable for detecting war dialing events; and
  (c) a war dialing event detection function for obtaining call information and using the information in at least one of the war dialing event and CDR databases to determine whether the call information is associated with a war dialing event.

24. The system of claim 23 wherein the war dialing event database includes a war dialing watch list containing calling party numbers associated with known or suspected war dialing calling parties.

25. The system of claim 23 wherein the war dialing event database includes war dialed call information including parameters associated with war dialed calls.

26. The system of claim 23 wherein the war dialing event database stores information regarding patterns of calls from the same calling party number.

27. The system of claim 23 wherein the war dialing event detection function is adapted to analyze CDRs stored in the CDR database to identify multiple short duration calls from the same calling party.

28. The system of claim 23 wherein the war dialing event detection function is adapted to examine the call detail records in the CDR database for patterns of calls from the same calling party.

29. The system of claim 23 wherein the war dialing event detection function is adapted to compare call detail records in the CDR database to war dialing event information in the war dialing event database to determine the presence of a war dialing event.

30. The system of claim 23 comprising a correlation function for analyzing the information in the CDR database and the war dialing event database to detect follow up calls by a war dialing calling party.

31. The system of claim 23 comprising a war dialing event mitigation function for performing a war dialing mitigation action in response to detection of a war dialing event.

32. The system of claim 31 wherein the war dialing event mitigation function is adapted to generate a notification message in response to detection of a war dialing event.

33. The system of claim 32 wherein the war dialing event mitigation function is adapted to block calls associated with war dialing events in progress.

34. The system of claim 23 comprising an exceptions database including information for identifying exceptions to war dialing events, wherein the war dialing event detection function is adapted to access the exceptions database in response to detecting call data relating to a potential war dialing event and to use the information in the exceptions database to determine whether the call data falls within an exception to a war dialing event.

35. A computer program product comprising computer executable instructions embodied in a computer readable medium, the method comprising:
  (a) receiving call signaling messages;
  (b) analyzing the call signaling messages to identify a plurality of calls from the same calling party within a predetermined time period;
  (c) determining whether the plurality of calls indicates a war dialing event; and
  (d) in response to determining that the plurality of calls indicates a war dialing event, performing a mitigating action.

36. The computer program product of claim 35 wherein determining whether the plurality of calls indicates a war dialing event includes determining whether the calls each have a duration that is less than a predetermined value.

37. The computer program product of claim 35 wherein determining whether the plurality of calls indicates a war dialing event includes analyzing called party numbers to determine whether the called party numbers are related to each other by a predetermined mathematical function.

38. The computer program product of claim 35 wherein determining whether the plurality of calls indicates a war dialing event includes determining whether the calling party falls within a war dialing event exception.

39. The computer program product of claim 38 comprising, in response to determining that the calling party falls within a war dialing event exception, indicating that the plurality of calls are not associated with a war dialing event.

40. The computer program product of claim 35 wherein determining whether the plurality of calls indicates a war dialing event includes detecting a plurality of IAM messages having the same circuit identification code from the same calling party within a predetermined time period, wherein the IAM messages have the same circuit identification code.

41. The computer program product of claim 35 wherein determining whether the plurality of calls indicates a war dialing event includes determining whether the plurality of calls indicates a phase 1 war dialing event.

42. The computer program product of claim 35 wherein determining whether the plurality of calls indicates a war dialing event includes determining whether the plurality of calls indicates a phase 2 war dialing event.

43. The computer program product of claim 42 wherein determining whether the plurality of calls indicates a phase 2 war dialing event includes determining whether the calls originate from a pay phone.

44. The computer program product of claim 35 wherein performing a mitigating action includes storing information in a database for identifying the calling party as a war dialer.

45. The computer program product of claim 44 comprising using the information in the database to identify subsequent war dialing events.

46. The computer program product of claim 35 wherein performing a war dialing event mitigating action includes capturing a geodesic location identifier parameter from a signaling message associated with a war dialed call and using the geodesic location identifier to locate a war dialer.

* * * * *

UNITED STATES PATENT AND TRADEMARK OFFICE
CERTIFICATE OF CORRECTION

PATENT NO. : 7,035,387 B2
APPLICATION NO. : 10/786713
DATED : April 25, 2006
INVENTOR(S) : Travis E. Russell et al.

It is certified that error appears in the above-identified patent and that said Letters Patent is hereby corrected as shown below:

Col. 18, line 20
replace "the method"
with --for performing steps--.

Signed and Sealed this

Seventeenth Day of October, 2006

JON W. DUDAS
*Director of the United States Patent and Trademark Office*